United States Patent
Davis

(10) Patent No.: US 10,414,533 B2
(45) Date of Patent: Sep. 17, 2019

(54) BAG ACCESSORY HOLDER

(71) Applicant: Thomas J Davis, Olympia, WA (US)

(72) Inventor: Thomas J Davis, Olympia, WA (US)

(*) Notice: Subject to any disclaimer, the term of this patent is extended or adjusted under 35 U.S.C. 154(b) by 0 days.

(21) Appl. No.: 15/896,270

(22) Filed: Feb. 14, 2018

(65) Prior Publication Data
US 2018/0229880 A1    Aug. 16, 2018

Related U.S. Application Data

(60) Provisional application No. 62/458,849, filed on Feb. 14, 2017.

(51) Int. Cl.
*B65B 67/12* (2006.01)
*B62B 1/26* (2006.01)

(52) U.S. Cl.
CPC .......... *B65B 67/1233* (2013.01); *B62B 1/266* (2013.01)

(58) Field of Classification Search
CPC .............................. B65B 67/1233; B62B 1/266
USPC ...... 280/47.26, 47.31; 248/95, 99, 100, 101; 383/33
See application file for complete search history.

(56) References Cited

U.S. PATENT DOCUMENTS

| | | | | |
|---|---|---|---|---|
| 1,455,536 A * | 5/1923 | Lebherz | ................... | B65B 67/12 248/100 |
| 2,462,973 A * | 3/1949 | Kelrick | ................... | B65B 67/12 24/343 |
| 2,805,885 A * | 9/1957 | Elzea | ................... | B62B 1/20 280/47.31 |
| 3,161,434 A * | 12/1964 | Jerpbak | ................... | B62B 1/20 280/47.31 |
| 3,389,818 A * | 6/1968 | Rinehart | ................... | B62B 1/16 280/47.26 |
| 4,124,185 A * | 11/1978 | Preisinger | ................... | B62B 1/14 248/101 |
| 4,287,701 A * | 9/1981 | Washington | ........ | B65B 67/1238 141/390 |
| 4,341,393 A * | 7/1982 | Gordon | ................... | B62B 1/20 248/98 |
| 4,488,697 A * | 12/1984 | Garvey | ................. | B65F 1/1415 248/101 |

(Continued)

FOREIGN PATENT DOCUMENTS

WO    WO-9429157 A1 * 12/1994    ............... B62B 1/20

*Primary Examiner* — Kimberly T Wood
(74) *Attorney, Agent, or Firm* — Dean A Craine; Marisa C. Whitaker

(57) ABSTRACT

A bucket waste bag holder accessory that includes a support ring with a pendent skirt with at least two legs attached or formed on the front surface of the support ring or pendent skirt. Formed on the distal ends of each leg is a U-shaped clip configured to snap fit over the rounded top edge of a bucket. During installation, the top edge of a plastic bag is folded over the support ring and the pendent skirt and the closed end of the plastic bag is extended through a center opening. The legs are sufficiently spaced apart and extend downward from the support ring to support the top opening of the bag is a suspended, elevated position above the bucket while the closed end of the plastic bag rests inside the bucket. In one embodiment, the legs are configured to selectively rotate enabling them to attach to buckets with different top edges. An optional elastic strap may hold the plastic bag on the support ring and pendent skirt when filling the plastic bag with waste.

7 Claims, 5 Drawing Sheets

(56) References Cited

U.S. PATENT DOCUMENTS

| | | | | |
|---|---|---|---|---|
| 4,805,858 A * | 2/1989 | Taylor | ................... | B65B 67/12 |
| | | | | 141/316 |
| 4,934,637 A * | 6/1990 | Guerrera | ................ | B65B 67/12 |
| | | | | 248/100 |
| 4,951,903 A * | 8/1990 | Frey | ................... | B65B 67/1222 |
| | | | | 248/99 |
| 5,020,751 A * | 6/1991 | Larkin | ................... | B65B 67/12 |
| | | | | 248/99 |
| 5,125,605 A * | 6/1992 | Guerrera | ................ | B65B 67/12 |
| | | | | 248/100 |
| 5,374,095 A * | 12/1994 | Ramseth | ................... | B62B 1/20 |
| | | | | 280/47.18 |
| 5,806,866 A * | 9/1998 | Fleischer | ................ | B62B 1/204 |
| | | | | 211/41.1 |
| 5,839,772 A * | 11/1998 | Toole | ....................... | B62B 1/20 |
| | | | | 296/32 |
| 9,067,700 B1 * | 6/2015 | Middleton | ......... | B65B 67/1233 |
| 2005/0017010 A1 * | 1/2005 | Siegel | ................ | B65B 67/1233 |
| | | | | 220/495.06 |
| 2012/0189230 A1 * | 7/2012 | King | ................... | B65F 1/1415 |
| | | | | 383/33 |
| 2013/0259405 A1 * | 10/2013 | Jack | ....................... | B65B 67/04 |
| | | | | 383/33 |

* cited by examiner

BAG ACCESSORY HOLDER

This non-provisional patent application is based on and claims the filing date benefit of U.S. provisional patent application (Application No. 62/458,849) filed on Feb. 14, 2017.

BACKGROUND OF THE INVENTION

1. Field of the Invention

This invention relates to yard waste disposal systems, and more particularly to such systems that uses an apparatus that holds a flexible plastic bag in an open position for easily filling over the bucket used with a wheelbarrow, a yard cart, or wagon.

2. Description of the Related Art

It is common for homeowners to deposit yard waste into thin walled, disposable plastic bags. Yard waste is deposited in the plastic bag and carried to different locations in the yard. When full, the plastic bag is then transported to a large yard bin where it is emptied or taken to the curbside for pickup by a sanitary worker.

One problem with using plastic bags for collecting yard waste is that it is difficult for one person to hold the bag's top open and simultaneously deposit yard waste into the top opening. This is especially difficult when the plastic bag is empty, wet, or partially filled. It is also difficult to deposit yard waste into the top opening of the plastic bag using an object, such as a lawn rake or a grass catcher, that is wider than the top opening.

Another problem with using plastic bags to collect yard waste is that the plastic bags become conical or a 'beaker-like' shape when filled with yard waste and difficult to manually carry. Because a partial or full plastic bag is heavy, the bottom of the plastic bag is prone to tearing if the bottom is not supported. To avoid these problems, some homeowners will transport a partially filled plastic bag in the bucket of a wheelbarrow, a yard cart, or a wagon and move the wheelbarrow, yard cart, or wagon to different locations in the yard. If the plastic bag is partially filled and shifts location in the bucket when in transit, the wheelbarrow, the yard cart, or wagon may overturn.

What is needed is a waste bag holding accessory that temporarily attaches to the top edge of the bucket on a wheelbarrow, yard card or wagon that securely holds the plastic bag over the center axis of the bucket and also holds the top opening of the plastic bag open in a convenient filling position. When the accessory is not needed, it can be easily removed from the bucket allowing the wheelbarrow, yard cart or wagon to be used for other purposes. What is also needed is such an accessory adjustable for use with buckets with different top edge configurations.

SUMMARY OF THE INVENTION

The above needs are met by a waste bag holding accessory that temporarily attaches to the front or rear top edges on the bucket on a wheelbarrow, a yard cart or a wagon. The accessory is configured to securely hold the plastic bag over the longitudinal center axis of the bucket when filled with yard waste. The accessory is also configured to hold the plastic bag's top opening in an open expanded position and conveniently oriented, so yard waste may be deposited into the plastic bag.

The accessory includes a rigid support ring with a diameter configured to receive and support the top opening of a 65-gallon, 45-gallon, 39-gallon, or 33-gallon plastic bag. It should be understood that the accessory could be used with larger or smaller bags. In one embodiment, the support ring forms a closed or partially closed circle, an oval, a square or a rectangle configured to hold open the top opening of a plastic bag when attached to the support ring. Attached or formed on the support ring is a perpendicularly aligned pendent skirt. The pendent skirt is sufficiently rigid to support the support ring and act as a support surface for an elastic strap that may be placed around the pendent skirt to hold a plastic bag on the accessory.

The accessory also includes to two legs that extend downward and attaches to the top edge of the bucket. Formed or attached to the distal end of each leg is an inverted U-shaped channel configured to selectively snap-fit over and grip the top edge of the bucket. In the embodiment shown, two legs located along the front arc of the support ring and spaced apart on opposite sides of the support ring's center axis. When attached to the top edge of the bucket, the two legs securely hold the adjacent edge of the support ring in an elevated above the top edge of the bucket. Additional screws or clamps may be attached to the distal ends of the legs that securely attach the legs to the top edge.

In one embodiment, each leg is made of rigid or semi-flexible material that holds its shape when supporting a plastic bag. The legs may be perpendicularly aligned or diagonally aligned with the top plane of the support ring. In another embodiment, the legs are configured to axially rotate along the X and Y axes support ring to repositioned to engage buckets with different top edge configurations and to position the support ring at a desired orientation.

During use, a plastic bag is unfolded, and the bottom, closed end of the plastic bag is extended downward through the support ring's center opening. The bag's top opening is then stretched and pulled over the support ring. The top portion of the plastic bag adjacent to the top edge is then folded outward and extended over the support ring and the pendent skirt. If a plastic bag has a top opening slightly smaller than the diameter of the support ring, then the plastic bag when stretched over the support ring and the pendent skirt may be sufficient taunt and no elastic strap is needed to hold the top edge of a plastic bag on the accessory. If the top opening of the plastic bag is the same diameter or slightly larger than the support ring, then an elastic strap must hold the plastic bag on the accessory.

When the plastic bag is full of yard waste, the plastic bag is then transported via the wheelbarrow, yard cart or wagon to a desired deposit site. The elastic strap is then removed, and the top edge of the plastic bag is unfolded from the support ring. The accessory can then be removed from the wheelbarrow, yard cart or the wagon enabling the entire plastic bag to lifted from the wheelbarrow, the yard cart, and wagon and discarded.

DESCRIPTION OF THE PREFERRED EMBODIMENT(S)

Figure 1:
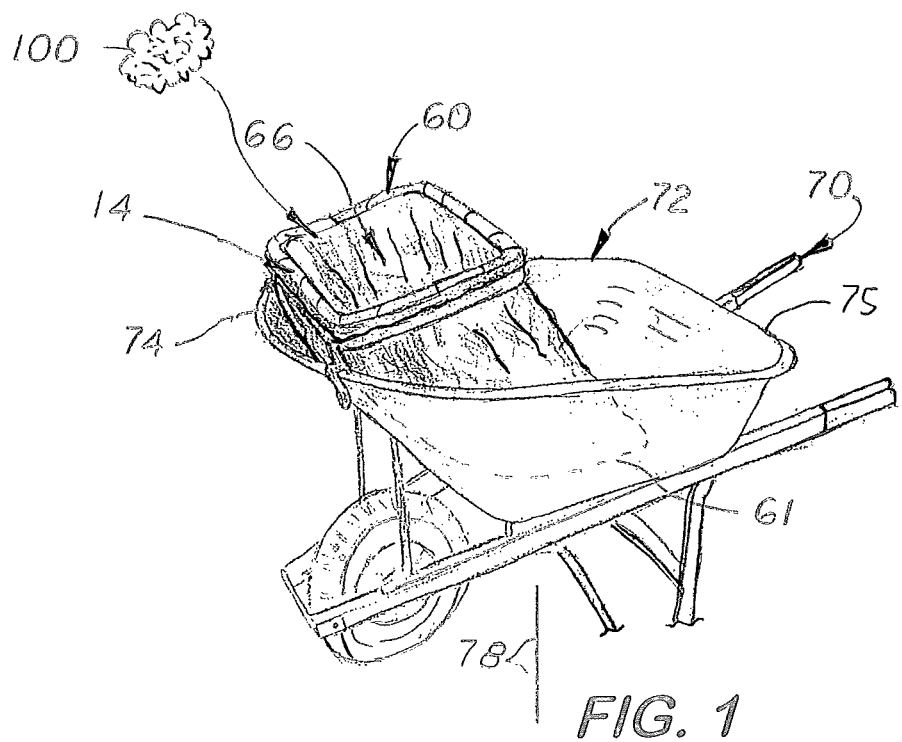
FIG. 1 is a perspective view of a wheelbarrow with bag holder accessory attached to the front top edge of the bucket and showing a plastic bag attached to the accessory and held in a filling position.
Figure 2:
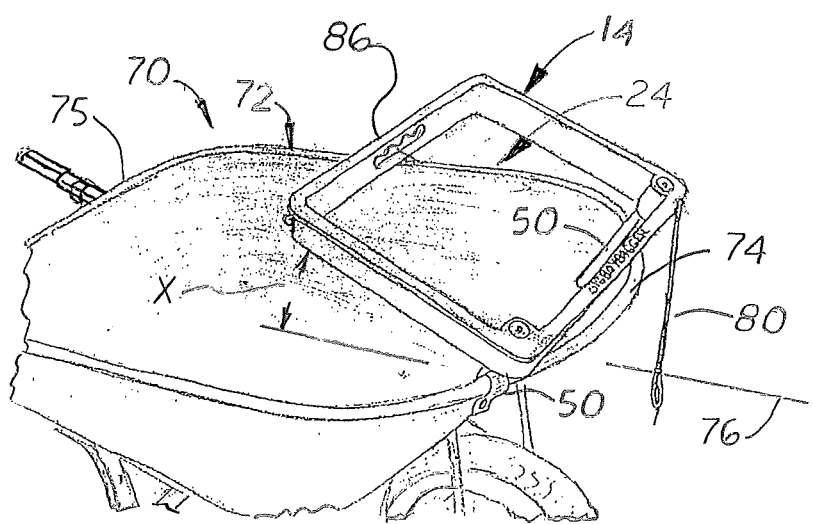
FIG. 2 is another perspective view of the bag holder accessory showing the support ring attached to the bucket on the wheelbarrow.

FIG. 1 is a perspective view of the portable yard waste bag holding accessory 14 attached to the top edge 74 of the bucket 72 on a moveable yard waste carrying device 70, such as a wheelbarrow, a hand truck, a yard cart, or a wagon. As shown in FIGS. 1 and 2 the accessory 14 is configured to hold an expanded plastic bag 60 over the bucket 72 so the closed end 61 of the plastic bag body 62 rests inside the bucket 72 and the top opening 66 of the plastic bag 60 is expanded and held in an opened stretched position above the top edge 74 of the bucket 72. The accessory 14 is sufficiently sturdy to hold the plastic bag 60 in a relatively fixed upright position above the bucket 72 while yard waste 100 is deposited inside the plastic bag 60. During use, the accessory 14 securely attached to either the front top edge 74 or the rear top edge 75 of the bucket 72 so the plastic bag's longitudinal axis is axially aligned the bucket's longitudinal axis 76 and the bucket's center of gravity 78 (see FIG. 1).

Figure 3:
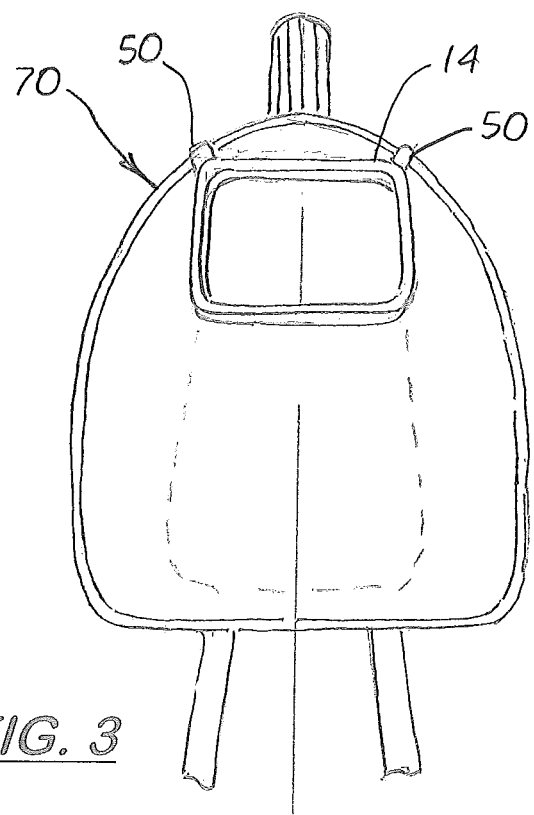
FIG. 3 is a top plan view of a contractor's style wheelbarrow that uses a bucket with a curved front top edge with the accessory attached to the top edge.
Figure 4:
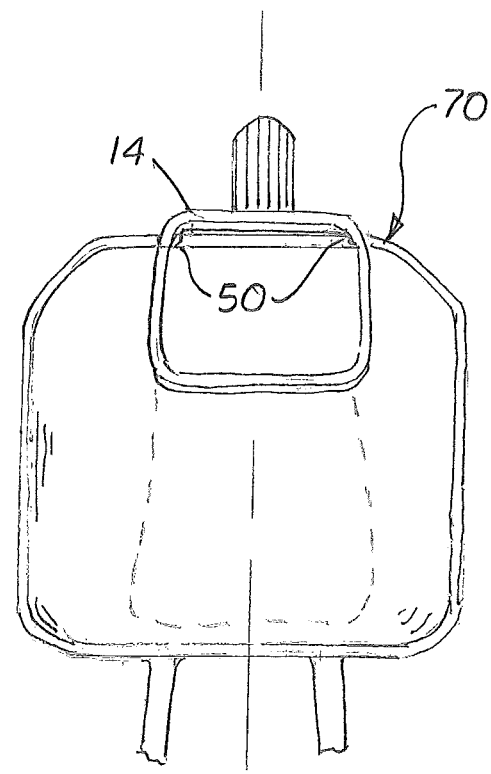
FIG. 4 is a top plan view of a gardener's wheelbarrow that uses a bucket with a straight front top edge with the accessory attached to the top edge.

As shown more clearly in FIGS. 3 and 4, the accessory 14 includes a rigid support ring 20. In the embodiment in FIGS., the support ring 20 is a continuous structure and forms an enclosed circle, square, rectangle or triangle, each with a wide center opening 24. When the support ring 20 is square or rectangular, it has four side segments 26, 28, 30, and 32 and four corners 34, 36, 38 and 40 as shown in FIG. 4. In the embodiment in FIG. 4, the support ring 20 has two downward extending legs 50 integrally formed or selectively attached to the two corners 34, 36 adjacent to the front side segment 26.

The legs 50 are sufficient in length so the support ring 20 is aligned in a substantially diagonal or horizontal suspended position over the central area of the bucket 72 as shown in FIGS. 1 and 2.

In the embodiment shown in the FIGS. 1-4, the accessory 14 includes a pendant skirt 22 attached or integrally formed on the support ring 20. The pendent skirt 22 extends downward from the support ring 20 and is sufficiently rigid to provide support for the support ring 20 and act as a support surface for an elastic strap 80 when used to hold the plastic bag 60 on the accessory 14.

During use, the closed end 61 of a plastic bag 60 is inserted through the support ring's center opening 24 and the bag's top edge 64 extends beyond the support ring 20. The top edge 64 is then folded outward and over the support ring 20 and the pendent skirt 22. In some instance, the size of the top opening 66 of the plastic bag 60 is slightly smaller than the diameter of the support ring 20 which requires the user to sketch the top edge 64 of the plastic bag over the support ring 20. In other cases, the top opening 66 of the plastic bag 60 is the same diameter or slightly larger than the support ring 20 requires an elastic strap 80 to hold the top edge 64 of the plastic bag 60 over the accessory 14. The elastic strap 80 may then be stretched over the outside surface of the top portion the plastic bag 60 extending over the pendent skirt 22. The elastic strap 80 is sufficiently tight to press inward and securely hold the plastic bag 60 in place on the support ring 20 as yard waste 200 is deposited through the support ring's center opening 24. Eyelets 82 may be attached to the pendent skirt 22 that may be used to hold the elastic strap 80 on the accessory.

Figure 5:
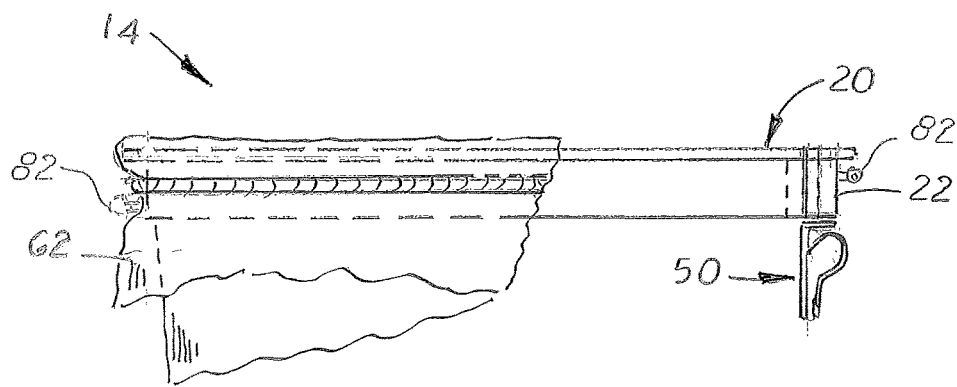
FIG. 5 is a side elevational view of the accessory with a support ring, a pendent skirt attached to the support ring, and an elastic strap used to hold the plastic bag over the pendent skirt.
Figure 6:
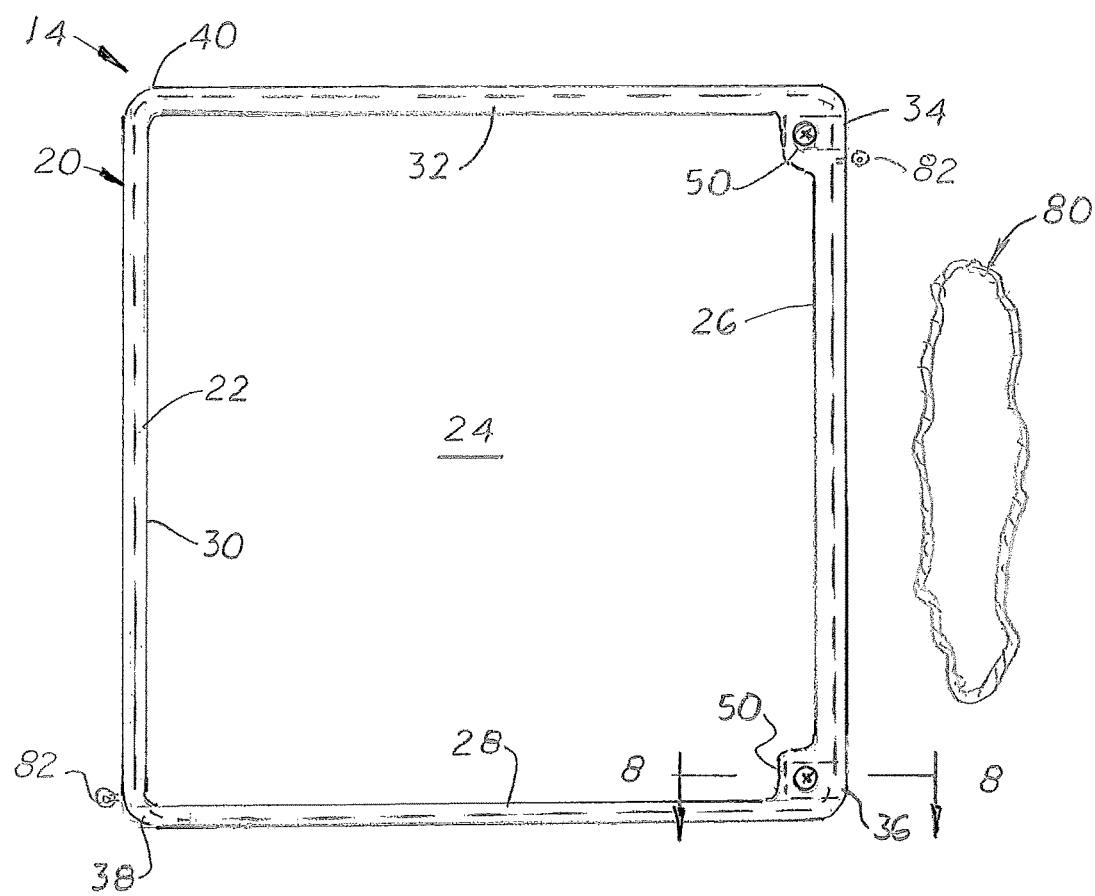
FIG. 6 is a top plan view of the support ring and the elastic strap.

As shown in FIG. 5, the distal ends of the legs 50 are attached or integrally formed on the lower edge of the pendent skirt 22 or attached to the two corners 34, 36 of the support ring 20. When attached to the corner, each leg 50 includes an upward extending post 52, an L-shaped bracket 54, and a flexible C-arm 58. The bracket 54 includes a first flange 55 and a perpendicularly aligned second flange 57. The C-arm 58 is attached to and extends outward from one side of the second flange 57. The C-arm 58 is made of flexible material and configured to snap-fit when pressed in a downward direction around the top edge 74 of a bucket 72.

Formed on two corners 34, 36 of the support ring 20 is a vertically aligned passageway (indicated by reference number 35) configured to receive a complimentary post 52 used with the leg 50. The passageway 35 is closed on one end and a bore 37 is formed that communicates with the passageway 35, A threaded connector 39 extends through the bore 37 and connects the post 52 to the support ring 20.

Formed on the first flange 55 is a second bore 56 that receives a threaded connector 53 to attach the L-shaped bracket 54 to the bottom surface of the post 52.

When assembled on a yard waste carrying device 70, the support ring 20 is positioned over the bucket 72 so the second flange 57 on each leg 50 is positioned against the inside surface of the bucket 72 and each C-shape arm 58 engages the top front edge 74 of the bucket 72. A waste bag 60 is unfolded and extended through the center opening 24 formed on the support ring 20. The top portion 66 of the waste bag 60 is folded rearward and over the support ring 20 and over outside surface of the pendent skirt 22. An elastic strap 80 is then placed around top portion 66 and the pendent skirt 22 to hold the waste bag 60 in place.

Figure 7:
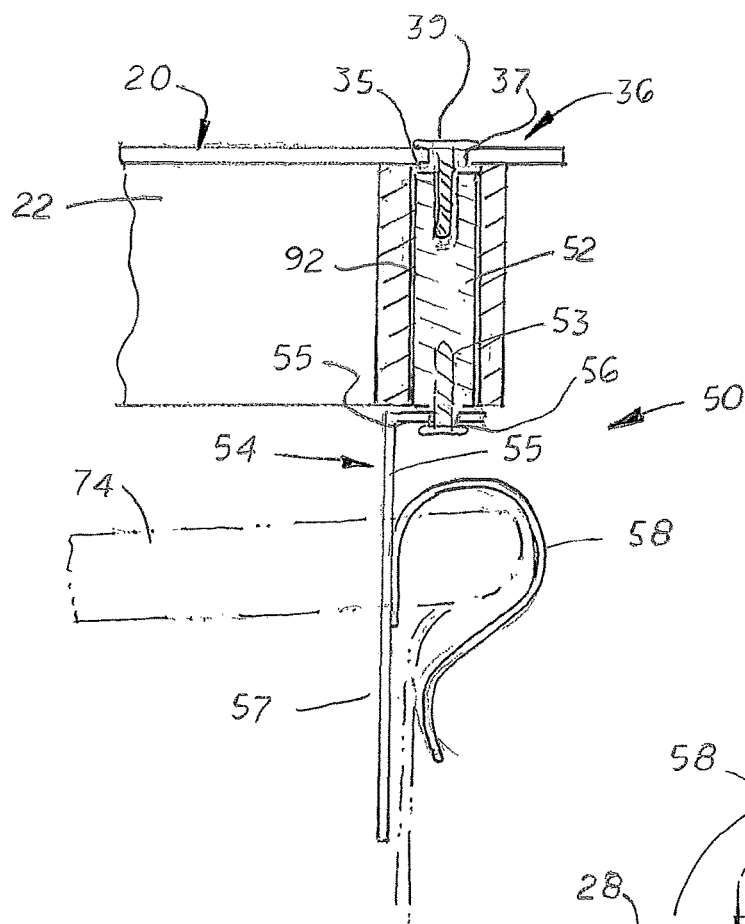
FIG. 7 is a sectional side elevational view of the corner of the support ring showing the leg with a clip being attached to the wheelbarrow.
Figure 8:
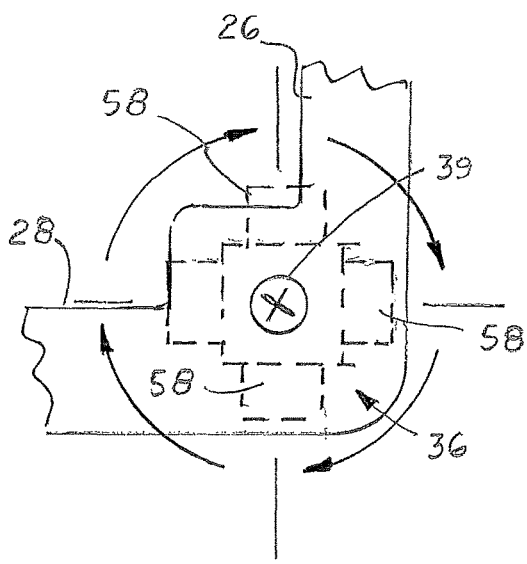
FIG. 8 is an illustration showing the leg being rotated to change the orientation of the clip.

FIG. 8 is an illustration showing the leg 50 being rotated to change the orientation of the c-arm 58. In one embodiment, shown in FIG. 7, stops 92 made be formed or attached to the support ring 20 or to the legs 50 that limit the rotation of the legs 50.

Figure 9:
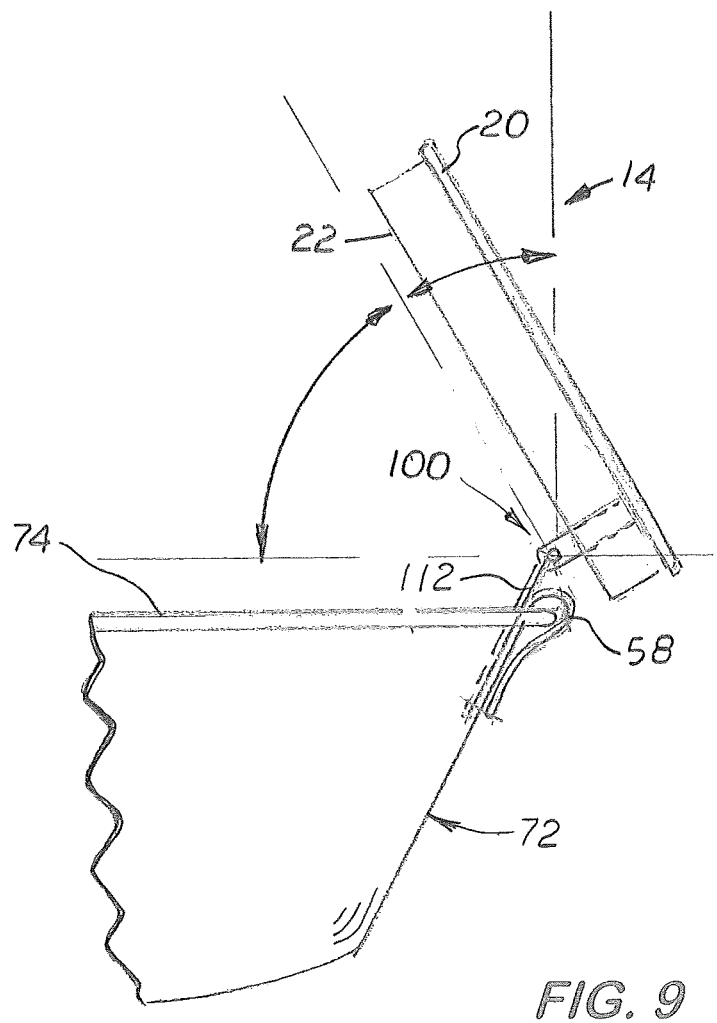
FIG. 9 is a side elevational view with second embodiment of the leg configured to rotate approximately 90 degrees around the leg's transverse axis.
Figure 10:
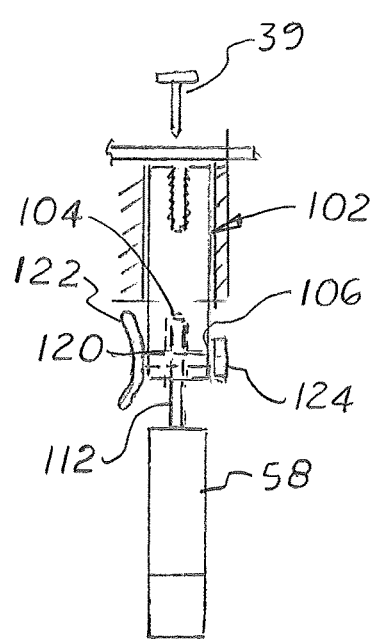
FIG. 10 is a front elevational view the second embodiment of the leg used in FIG. 9

FIGS. 9 and 10 show a second embodiment of the leg, indicated by reference number 100 that uses a modified post 102 designed to slide into the passageway 35 formed on the pendent skirt. The post 102 includes a lower slot 104 configured to receive the modified bracket 110. The modified bracket 110 includes a straight member 112, with a clip 58 mounted on its outside surface. Formed on one end of the straight member 112 is a hole 114 aligned and registered with holes 106 formed on the opposite sides of the modified post 102. During assembly, a bolt 120 with a wing nut 122 attached to one end fits into the holes 106, 114, and connects to a nut 124 on the opposite side of the modified post 120.

When the wing nut 122 is tightened, the member 112 is held tightly in the slot 104. During use, the user may loosen and tighten the wing nut 122 to adjust the angle of the support member 20 relative to the post to change the angle of the support member 20 on the bucket 74.

The support ring 20 is square or rectangular and 12 to 15 inches in length on each side wall. The support ring 20 may also be circular or oval (15 to 20 inches in diameter). The skirt 22 support ring 20 is approximately 2 inches in length. The legs 50 are approximately 5 inches in length. An optional grip handle opening 86 may be formed on one side of the pendent skirt used to manually carry the accessory 14.

In compliance with the statute, the invention described has been described in language more or less specific on structural features. It should be understood, however, that the invention is not limited to the specific features shown, since the means and construction shown comprises only the preferred embodiments for putting the invention into effect. The invention is therefore claimed in any of its forms 20. The waste bag 60 is shoved downward so that the bottom of the bag 60 rests inside the bucket or modifications within the legitimate and valid scope of the amended claims, appropriately interpreted under the doctrine of equivalents.

I claim:

1. A bag holder for holding and supporting a flexible bag with a top opening and a closed end in an elevated, diagonally aligned position over a bucket used with a wheel barrow, yard card or wagon, comprising;
   a. a continuous support ring with a center opening configured to receive said flexible bag, said support ring also includes a perimeter outer edge sufficient in diameter to hold said top opening of said bag open when a top portion of said flexible bag is folded around said outer edge;
   b. a continuous pendent skirt attached to and formed on said support ring, said pendent skirt extending downward from said support ring, said pendent skirt includes an outside surface located below and aligned inward from said outside edge of said support ring;
   c. two legs extending downward from one side of said pendent skirt configured to hold said support ring a fixed elevated angle above said bucket, each said leg configured to be axially rotated and then selectively fixed at a set position on said pendent skirt, each said leg includes a distal end with a clip configured to selectively engage a top edge of said bucket when said support ring is pressed downward onto a top edge on said bucket; and
   d. an elastic strap configured to extend around said outside surface of said pendent skirt and apply an inward force against a top portion of said flexible bag when said flexible bag is extend through said center opening and folded over said outside surface of said pendent skirt to hold said flexible bag on said support ring.

2. The bag holder as recited in claim 1, wherein the legs extend are orientated at an angle between 60 to 120 degrees from the support ring.

3. A method for depositing yard waste into a flexible bag and transporting said flexible bag, comprising the following steps:
   a. selecting a wheelbarrow, yard cart or wagon with a bucket with a top edge;
   b. selecting a yard waste holding apparatus that includes a continuous support ring with a downward extending, perpendicularly aligned continuous pendent skirt and a center opening sufficient in size to receive an expanded flexible bag with a top opening and a closed end, said support ring includes an outside surface and is sufficient in shape and diameter so that when said closed end of a flexible bag is inserted through said center opening and said top opening of the said flexible bag folded over said support ring, said top opening is expanded, said support ring includes an outside edge and said pendent skirt includes an outside surface located inward from said outside edge of said support ring; said apparatus also includes two legs extending downward from said pendent skirt, each said leg includes a distal end with an adjustable U-shaped clip configured to selectively engage a top edge of a bucket used with a wheelbarrow, a yard cart or a wagon;
   c. attaching the two legs to the top edge of a bucket used on a wheelbarrow, yard cart or wagon so that said support ring extends over said bucket, each said leg configured to be axially rotated and then fixed at a set position on said pendent skirt;
   d. selecting a flexible bag with closed bottom end, a top edge and a top opening;
   e. inserting said closed end of said flexible bag into said center opening on said support ring and resting said closed bottom end of the said flexible bag inside said bucket and folding said top edge of said flexible bag over said support ring and said outside surface of said pendent skirt to open said top opening of said flexible bag;
   f. extending an elastic strap around said top edge of the flexible bag which extends around said pendent skirt to securely hold said top edge of the flexible bag against said pendent skirt, and
   g. depositing yard waste into said top opening of said flexible bag.

4. The method, as recited in claim 3, further including the steps of removing said elastic strap from said pendent skirt and removing said flexible bag from said support ring.

5. The method, as recited in claim 4, wherein said support ring is first removed from said bucket before said flexible bag is removed from said support ring.

6. The bag holder, as recited in claim 1, wherein said clip is an inverted U-shaped structured configured to slide onto and grip said top edge of said bucket.

7. The bag holder, as recited in claim 1, further including a passageway formed in said pendent skirt and said each leg further includes a post configured to slide into said passageway.

* * * * *